US012011783B2

(12) United States Patent
Vanselous et al.

(10) Patent No.: US 12,011,783 B2
(45) Date of Patent: Jun. 18, 2024

(54) SCRIBING THIN CERAMIC MATERIALS USING BEAM FOCAL LINE

(71) Applicant: CORNING INCORPORATED, Corning, NY (US)

(72) Inventors: Heather Nicole Vanselous, Painted Post, NY (US); Kristopher Allen Wieland, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 800 days.

(21) Appl. No.: 17/056,046

(22) PCT Filed: May 23, 2019

(86) PCT No.: PCT/US2019/033731
§ 371 (c)(1),
(2) Date: Nov. 17, 2020

(87) PCT Pub. No.: WO2019/226886
PCT Pub. Date: Nov. 28, 2019

(65) Prior Publication Data
US 2021/0205932 A1 Jul. 8, 2021

Related U.S. Application Data

(60) Provisional application No. 62/676,324, filed on May 25, 2018.

(51) Int. Cl.
*B23K 26/53* (2014.01)
*B23K 26/0622* (2014.01)
(Continued)

(52) U.S. Cl.
CPC .......... *B23K 26/53* (2015.10); *B23K 26/0624* (2015.10); *B23K 26/064* (2015.10);
(Continued)

(58) Field of Classification Search
CPC .. B23K 26/53; B23K 26/0624; B23K 26/064; B23K 26/082; B23K 26/0738;
(Continued)

(56) References Cited

U.S. PATENT DOCUMENTS

| 2014/0141579 A1* | 5/2014 | Tian | .................. | B23K 26/0734 |
| | | | | 438/166 |
| 2015/0015563 A1 | 1/2015 | Kaplan et al. | | |

(Continued)

FOREIGN PATENT DOCUMENTS

| TW | I580096 B | 4/2017 |
| WO | 2016/077171 A2 | 5/2016 |

OTHER PUBLICATIONS

International Search Report and Written Opinion of the International Searching Authority; PCT/US2019/033731; dated Aug. 20, 2019; 8 Pages; European Patent Office.

(Continued)

*Primary Examiner* — Janie M Loeppke
*Assistant Examiner* — Theodore J Evangelista

(57) ABSTRACT

Embodiments of a method of scribing a ceramic material are provided. In the method, a ceramic material having a thickness of 500 μm or less between a first outer surface and a second outer surface is provided. The second outer surface is opposite the first outer surface. A beam focal line is directed at the ceramic material, and the beam focal line has a length over which its intensity is greater than a damage threshold of the ceramic material. The length is longer than the thickness of the ceramic material. Further, a damage track defining at least a first section of the ceramic material and a second section of the ceramic material is created by moving the beam focal line relative to the ceramic material. Also provided are embodiments of a laser scribed component and embodiments of a laser scribed ceramic substrate.

20 Claims, 6 Drawing Sheets

(51) Int. Cl.
*B23K 26/064* (2014.01)
*B23K 26/073* (2006.01)
*B23K 26/082* (2014.01)
*B23K 103/00* (2006.01)

(52) U.S. Cl.
CPC ........ *B23K 26/0738* (2013.01); *B23K 26/082* (2015.10); *B23K 2103/52* (2018.08)

(58) Field of Classification Search
CPC .............. B23K 2103/52; B23K 26/073; B23K 26/0622; B23K 103/00
See application file for complete search history.

(56) References Cited

U.S. PATENT DOCUMENTS

| | | | |
|---|---|---|---|
| 2015/0151380 A1* | 6/2015 | Hosseini | B23K 26/53 219/121.72 |
| 2015/0165563 A1* | 6/2015 | Manley | B23K 26/53 65/102 |
| 2015/0360991 A1 | 12/2015 | Grundmueller et al. | |
| 2017/0355635 A1* | 12/2017 | Li | B23K 26/402 |
| 2018/0029919 A1* | 2/2018 | Schnitzler | B23K 26/08 |
| 2018/0057390 A1* | 3/2018 | Hackert | C03B 33/0215 |
| 2018/0117708 A1 | 5/2018 | Ortner et al. | |

OTHER PUBLICATIONS

Collins et al., "Mechanically inspired laser scribing of thin brittle materials", Journal of the American Ceramic Society, vol. 100, No. 11, Jul. 2017, pp. 5318-5326.

\* cited by examiner

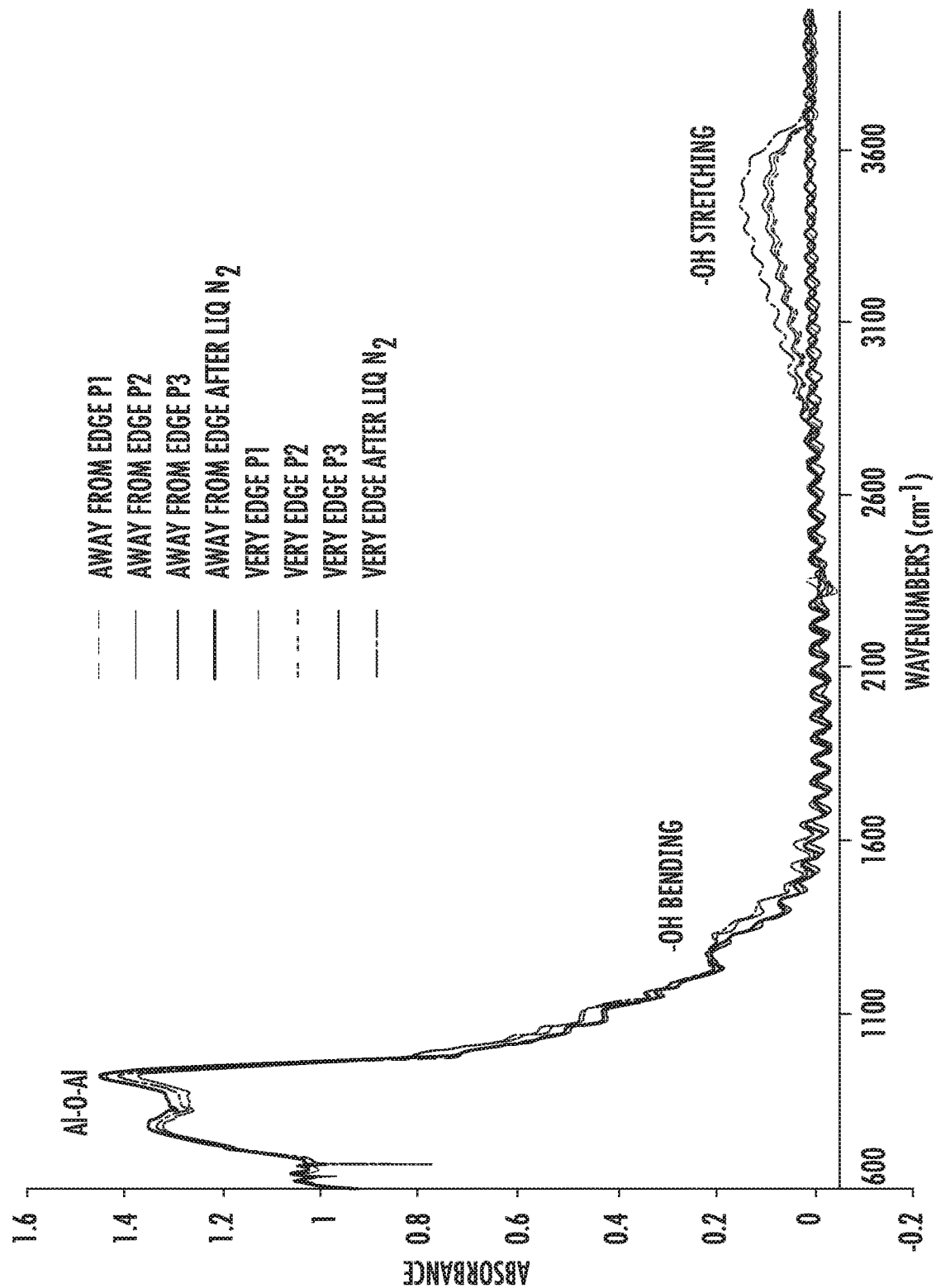

SCRIBING THIN CERAMIC MATERIALS USING BEAM FOCAL LINE

CROSS-REFERENCE TO RELATED APPLICATIONS

This application claims the benefit of priority under 35 U.S.C. § 371 of International Application No. PCT/US2019/033731, filed on May 23, 2019, which claims the benefit of priority of U.S. Provisional Application Ser. No. 62/676,324 filed on May 25, 2018 the contents of which are relied upon and incorporated herein by reference in their entirety as if fully set forth below.

BACKGROUND

The disclosure relates generally to a method for separating sections of ceramic materials and, in particular, to a method of laser scribing thin ceramics. Ceramic materials are incorporated into a variety of electronic components. Thin ceramics are used in situations where there is a desire to reduce the size of an electronic component and/or where there is a desire to increase the energy density of an electronic component. The manner in which these thin ceramics are processed affects their ability to maintain advantageous properties when used for such purposes. In particular, such thin ceramics are not able to be cut using techniques designed for thick (>>mm) ceramics, such as cutting using a $CO_2$ laser. Other techniques, such as laser ablation, also have their drawbacks.

SUMMARY

In one aspect, embodiments of the disclosure relate to a method of scribing a ceramic material. In the method, a ceramic material having a thickness of 500 µm or less between a first outer surface and a second outer surface is provided. The second outer surface is opposite the first outer surface. A beam focal line is directed at the ceramic material, and the beam focal line has a length over which its intensity is greater than a damage threshold of the ceramic material. The length is longer than the thickness of the ceramic material. Further, a damage track defining at least a first section of the ceramic material and a second section of the ceramic material is created by moving the beam focal line relative to the ceramic material.

In another aspect, embodiments of the disclosure relate to a laser scribed ceramic component. The component includes a ceramic material having a thickness of 500 µm or less between a first outer surface and a second outer surface. Further, the component includes a scribed edge having at a plurality of ablated regions extending from the first outer surface into the thickness of the ceramic material. Each ablated region is spaced from 2 µm to 50 µm apart an adjacent ablated region. Further, each of the plurality of ablated regions have a first surface roughness and a depth of less than 10 µm. Additionally, a remainder of the scribed edge is a cleaved edge having a second surface roughness. The first surface roughness is less than the second surface roughness.

In still another aspect, embodiments of the disclosure relate to a laser scribed ceramic substrate. The ceramic substrate includes a ceramic material having a first surface and a second surface in which the second surface is opposite the first surface. The first surface and the second surface define a thickness of the ceramic material, which is less than 500 µm. Further, the ceramic substrate includes a damage track formed onto the first surface of the ceramic material. The damage track includes a plurality of ablated regions in which each ablated region is spaced from 2 µm to 50 µm apart from an adjacent ablated region. The damage track defines at least a first section of the ceramic material and a second section of the ceramic material.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 10 is a graph showing moisture absorption at an edge of thin ceramic cut via laser ablation.

DETAILED DESCRIPTION

Referring generally to the figures, embodiments of the present disclosure relate to a method of laser scribing a thin ceramic material and to ceramic materials produced through laser scribing. Laser scribing to separate a section of ceramic material involves translating a beam focal line and a ceramic material relative to one another, which creates a series of damage points along the ceramic material. Upon applying a mechanical or thermomechanical stress to the ceramic material, the sections will separate along the series of damage points. Advantageously, the separation produces no kerf, i.e., there is no cut width such that the separated sections of ceramic material are essentially complementary. Also advantageously, the overall process of laser scribing can be performed at a much faster speed than other processing techniques, such as laser ablation. The process of laser scribing, ceramic materials produced via laser scribing, and the advantages of laser scribing ceramic materials, especially thin ceramic materials, will be discussed in the following sections. Embodiments described herein are for the purposes of illustration and should not be considered limiting.

Figure 1:
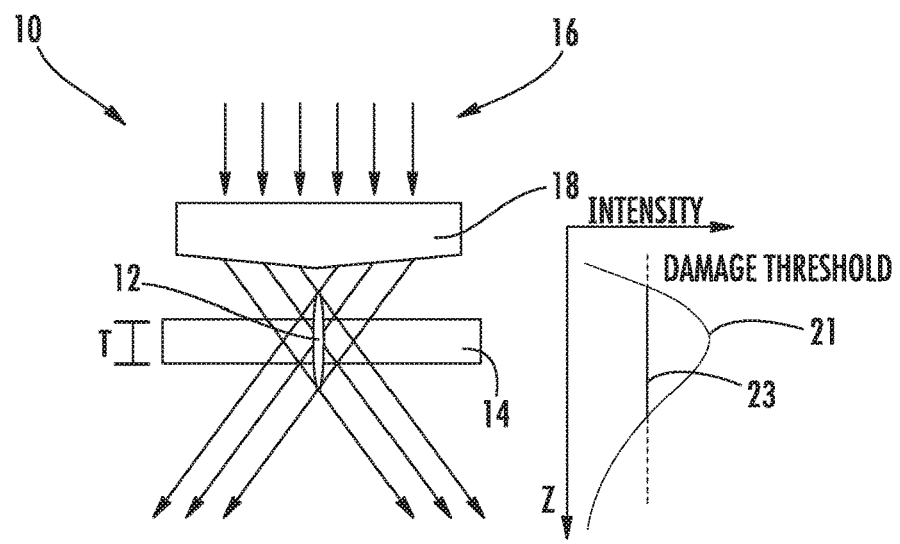
FIG. 1 depicts a Bessel beam focal line and an intensity profile, according to an exemplary embodiment.

FIG. 1 depicts a simplified schematic representation of laser arrangement 10 that produces a beam focal line 12 configured to scribe a ceramic material 14. In particular, laser light 16 is directed into an optical assembly 18 to create a quasi-non-diffracting beam (e.g., a Bessel beam, an Airy beam, a Weber beam, or a Mathieu beam). Specifically, FIG. 1 depicts a Bessel beam focal line 12. Embodiments of a laser arrangement 10 suitable for use in the presently disclosed laser scribing method is described in U.S. Publication Nos. 2015/0360991, published on Dec. 17, 2015, and 2015/015563, published on Jun. 18, 2015, the contents of both are incorporated herein by reference in their entireties.

As can be seen in the graph of FIG. 1, intensity 21 of the beam focal line 12 varies as a function of distance from the optical assembly 18, following a Gauss-Bessel profile. In particular, the intensity 21 of the beam focal line 12 of FIG. 1 increases somewhat rapidly with increasing distance until it reaches a peak intensity 21 and then gradually tapers as the distance continues to increase.

The graph in FIG. 1 also depicts a "damage threshold" 23, which corresponds to the level of intensity 21 needed to damage the ceramic material 14. This damage threshold 23 can be seen visually progressing from no damage (below threshold) to marking the material. Without wishing to be bound by theory, it is believed that, through a non-linear absorption process, regions of beam focal line 12 above the damage threshold 23 cause local reconfiguration and separation of excited atoms or bonds from adjacent atoms or bonds. This process can be different in the bulk of the material compared to the surface because of the energies at the surface. When the energy is increased, damage can also result in removal of material from the region where the beam focal line 12 passes. The removal of material creates structural defects that mechanically weaken the material and render it more susceptible to cracking or fracturing along the predetermined line upon application of mechanical, thermal, and/or thermomechanical stress. Such damage is created where the portion of the intensity 21 curve of the beam focal line 12 is at or above the damage threshold 23, which corresponds to the part of the beam focal line 12 usable to laser scribe the ceramic material 14. In the embodiment depicted, the usable portion of the beam focal line 12 is longer than the ceramic material 14 is thick. Thus, the beam focal line 12 is sufficient to laser scribe the ceramic material 14.

The laser scribing method described herein is designed in particular to cut thin ceramic materials 14 of various compositions. By "thin," it is meant that the ceramic material 14 has a thickness T of no more than 500 µm. In embodiments, the ceramic material 14 has a thickness T of no more than 100 µm, and in still other embodiments, the ceramic material has a thickness T of no more than 50 µm. In embodiments, the ceramic material 14 has a thickness T of at least 10 µm. In other contemplated embodiments, the ceramic material 14 processed using technology disclosed herein may be thicker, such as greater than 500 µm, and/or less than 2 mm, and/or less than 1 mm, or thicker still, for example.

The laser scribing process can be used with a variety of ceramic materials 14. For example, alumina, zirconia, titania, and silica are all exemplary ceramics usable with the disclosed laser scribing process. In general, the laser scribing process is insensitive to the ceramic material used. That is, the laser scribing process can be used with a wide variety of ceramic materials beyond those mentioned herein.

Advantageously, thin ceramic materials 14 have superior dielectric and thermal properties as compared to other substrates, such as glass, and when cut using the scribing process disclosed herein, the thin ceramic materials 14 also have a higher fracture toughness and edge strength as compared to other substrate materials, such as glass, and as compared to similar materials cut using different processes, such as laser ablation. In particular, the edge strength directly relates to the radius over which the thin film can be bent before breaking. A higher edge strength correlates to a smaller bend radius, which is particularly useful in battery and capacitor applications. In embodiments, thin ceramic materials produced via the disclose laser scribing process have an edge strength of in the range of up to 620 MPa to 750 MPa. Additionally, ceramics have a higher thermal conductivity when compared with other materials that can be made thin and flat, for example plastics and glass, which allows for greater thermal dissipation when used, e.g., in electronic components.

Figure 2A:
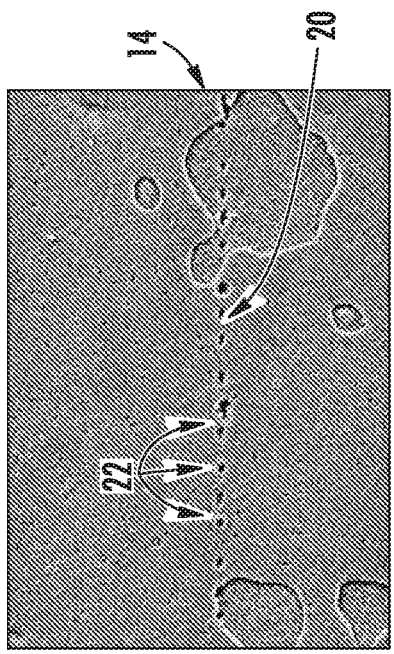
FIGS. 2A-2D are SEM images of a damage track across a thin ceramic material.
Figure 2B:
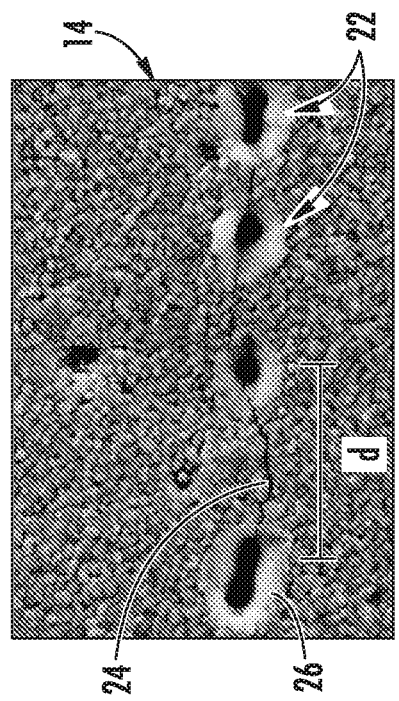
Figure 2C:

During laser scribing, a pulsed beam focal line 12 is used to create a damage track that can be seen on an upper surface of the ceramic material 14. FIG. 2A depicts a damage track 20 that was formed on the surface of a ceramic material 14. FIG. 2B provides a more magnified view of the damage track 20, and it can be seen that the damage track 20 consists of a series of ablation regions 22 formed into the ceramic material 14. FIG. 2C depicts an even further magnified view of the damage track 20 consisting of ablation regions 22 in the ceramic material 14. In the still further magnified view shown in FIG. 2D, the formation of a crack 24 between the ablation regions 22 at least on the upper surface of the ceramic material 14 can be seen. Additionally, it can be seen that that the ablation regions 22 have a smooth periphery 26, which is characteristic of ablation processes.

Figure 2D:
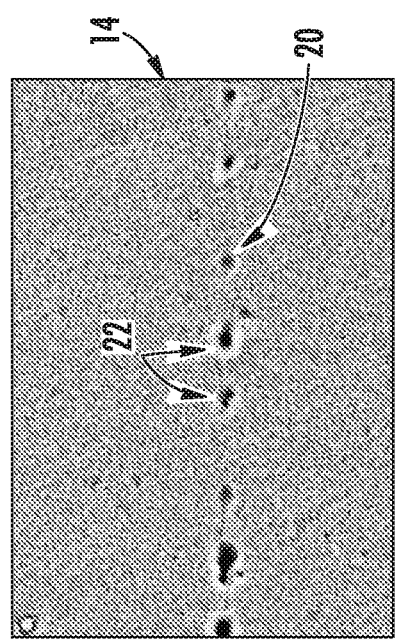

As shown in FIG. 2D, ablation regions 22 are spaced apart along the damage track 20 by a distance d. In embodiments, the ablation regions are spaced a distance d of from 2 µm to 50 µm apart. The spacing can be in regular or irregular intervals, i.e., the distance d between each ablation region 22 can be the same or different along the damage track 20. The ablation regions 22 themselves have a width of approximately 0.1 µm to 5 µm depending on the number and timing of pulses and the speed at which the ceramic material 14 is translated relative to the laser arrangement 10. In embodiments, the ablation regions 22 have a depth of 10 µm or less. In other embodiments, the ablation regions 22 have a depth of 5 µm or less.

In embodiments, the beam focal line 12 is pulsed on and off during the laser scribing process to produce the ablation regions 22 of the damage track 20. In further embodiments, the beam focal line 12 is pulsed in bursts during the laser scribing process to produce the ablation regions 22 of the damage track 20. In embodiments, a burst consists of a series of pulses over a certain length of time that deliver a specified amount of power. In certain embodiments, a burst includes up to 25 or more pulses over a pulse duration of 1 psec to 1000 psec. Each pulse may have a duration of, e.g., about 0.1 psec to about 75 psec and deliver from about 100 to about 25000 of energy. The time between pulses and the speed of translation determine the spacing of the ablation regions 22 along the damage track 20. In embodiments, about 1 nsec to about 50 nsec separates each pulse.

Further, in embodiments, the speed at which the laser arrangement and the ceramic material are translated relative to each other is up to 1 m/sec and requires only a single pass to create the damage track. In other embodiments, the speed of translation is up to 5 m/sec and requires only a single pass to create the damage track. As will be understood by those of ordinary skill in the art, the combination of speed and number of required passes is faster than conventional laser ablation techniques. Ablation techniques require scanning of a beam focal point to damage the full depth of the material, which requires multiple passes of the laser over the material. Thus, even if the laser used in an ablation technique were to be moved at similar speeds as a laser in a laser scribing process, the overall speed of the laser ablation process is decreased because of the number of passes required. For example, if the laser was moved at the same speed during a laser scribing process and during a laser ablation process and if the laser ablation process required 10 passes to perform a cut, then the laser scribing process would be an order of magnitude faster than the laser ablation process. Indeed, considering the speed of laser movement and number of passes required for each process, the overall speed of a laser scribing process is on the order of meters per second, whereas the overall speed of laser ablation is on the order of millimeters per second, making laser ablation a comparatively time consuming and slow process.

In an exemplary embodiment, a laser was optically configured to have a FWHM line length in air of 1.7 mm and a numerical aperture ("NA") of 0.27 was used to laser scribe a ceramic material. The damage track included ablation regions spaced apart by 10 μm. In an embodiment with the same optical configuration, the laser delivered 400 μJ of energy over 5 pulses per burst ("burst 5"). In another such embodiment with the same optical configuration, the laser delivered 500 μJ of energy with a burst 10, and in still another such embodiment, the laser delivered 500 μJ of energy with a burst 12.

Figure 3:
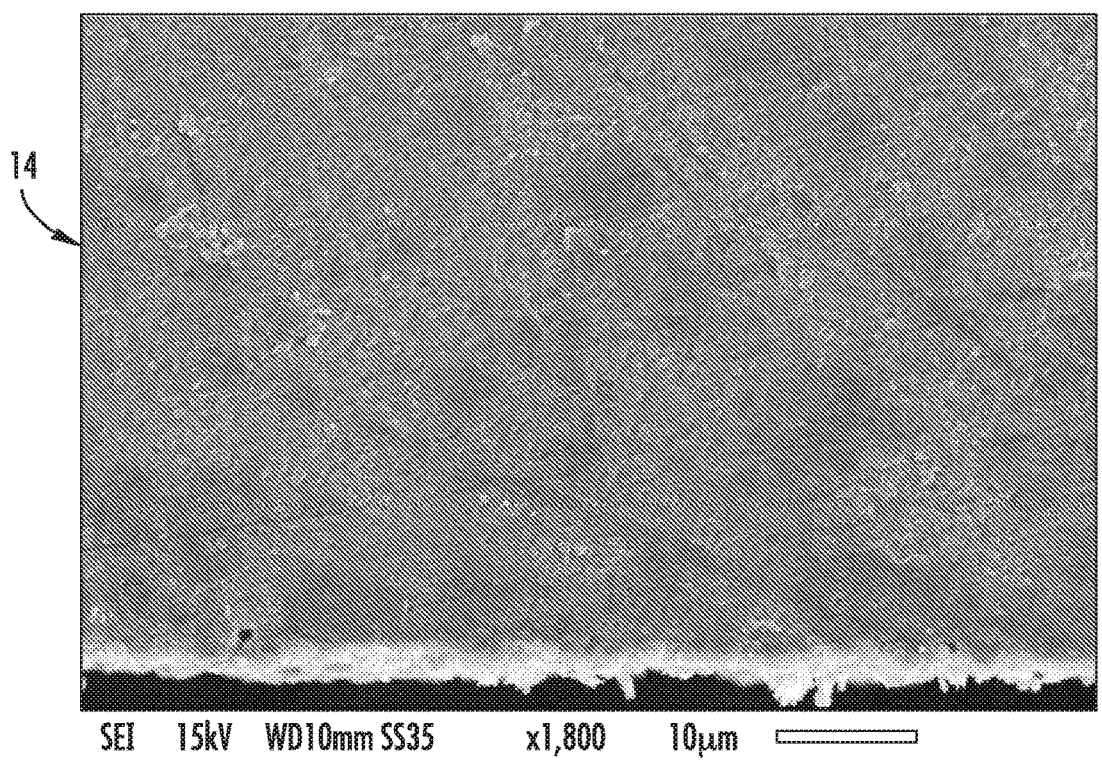
FIG. 3 is an SEM image of a surface of a thin ceramic material cut using laser scribing.
Figure 4:
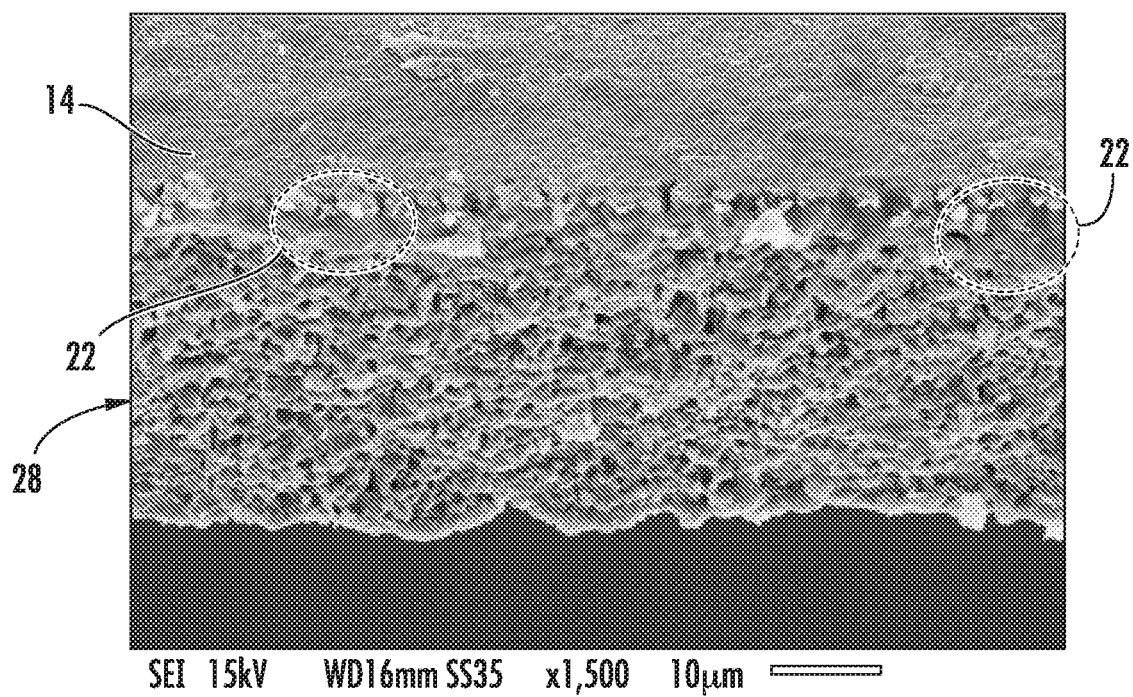
FIG. 4 is an SEM image of a scribed edge surface of the thin ceramic material of FIG. 2.

FIGS. 3 and 4 depict a thin ceramic material 14, specifically alumina, that was cut using the described laser scribing method. FIG. 3 depicts a top view of the thin ceramic material 14. As can be seen the top surface is relatively smooth and does not contain any material that recondensated during the laser scribing process. FIG. 4 depicts a scribed edge 28 created using the laser scribing process. As can be seen, the scribed edge 28 is substantially granular and is primarily a cleaved edge, i.e., the edge surface is characterized by fracture along grain boundaries. As discussed above, ablation regions 22 can be seen periodically along the upper surface of the ceramic material 14. The ablation regions 22 are generally smoother than the surrounding cleaved edge. In embodiments, the ablation regions 22 comprise less no more than 10% of the surface area of the scribed edge 28 with the remainder of the scribed edge 28 surface area being cleaved edge. In other embodiments, the ablation regions comprise less no more than 5% of the surface area of the scribed edge 28 with the remainder of the surface area of the scribed edge 28 being cleaved edge. In embodiments, the ablation regions 22 comprise less no more than 2% of the surface area of the scribed edge 28 with the remainder of the surface area of the scribed edge 28 being cleaved edge. As can be recognized from FIG. 4, the ablation regions 22 are smoother than the cleaved edge portion of the scribed edge 28. That is, the ablation regions 22 have a lower surface roughness than the cleaved edge portion of the scribed edge 28. Overall, though, because the scribed edge is substantially cleaved edge, the scribed edge 28 has a surface roughness that is greater than the typical surface roughness an edge produced through other processes, such as laser ablation.

Figure 5:
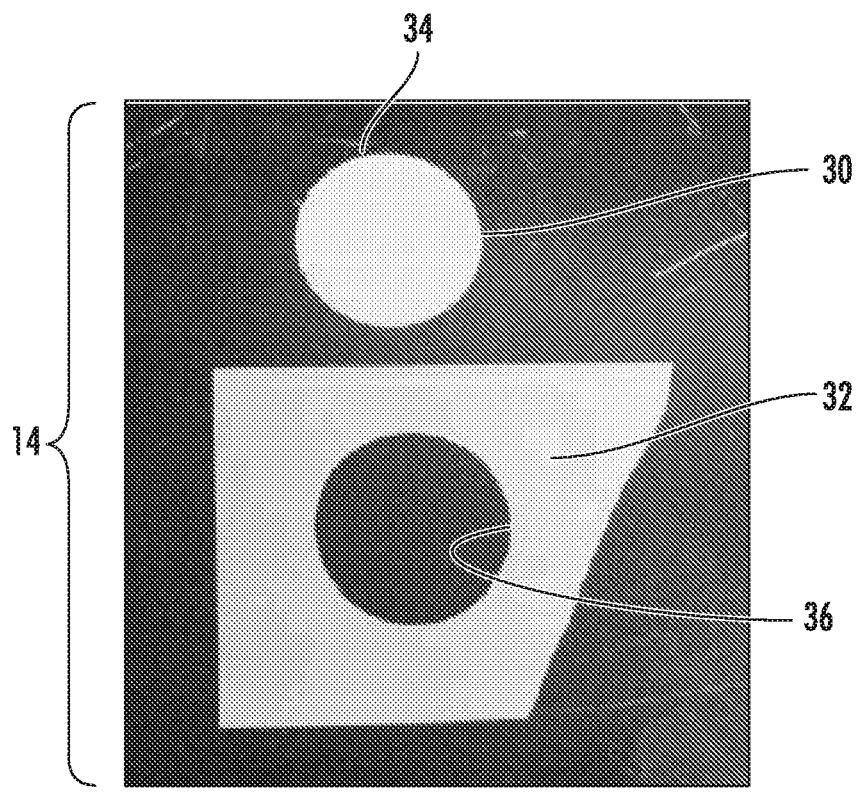
FIG. 5 depicts a section of a thin ceramic material removed from a sheet of the thin ceramic material.

FIG. 5 depicts a thin ceramic material 14 from which a first section 30 of ceramic material 14 was removed from a second section 32 of ceramic material 14. As can be seen in FIG. 5, the laser arrangement was used to trace a circular damage track in the thin ceramic material 14. Once the damage track is traced, only a small mechanical force of 20 MPa or less is needed to cause the ceramic sheet to separate along the damage track. For example, the first section 30 shown was removed from the second section 32 by simply bending the edges of the sheet slightly upward by hand. However, sections 30, 32 of ceramic material can be separated in a variety of other ways. For example, a thermal laser (e.g., a CO or $CO_2$ laser) could be used to induce thermomechanical stress along the damage track so as to cause separation of the sections 30, 32. Further, as can be noted from FIG. 5, the first section 30 fits precisely within the circular hole of the second section 32 because the laser scribing method produces no kerf. In this way, the outer edge 34 of the first section 30 is complementary to the inner edge 36 of the second section 32. As such, both the first section 30 and the second section 32 are usable manufacturing products with finished edges. That is, the one section does not have to be sacrificed for the production of the other, e.g., to account for a wide kerf or inadequate edge properties.

Figure 6:
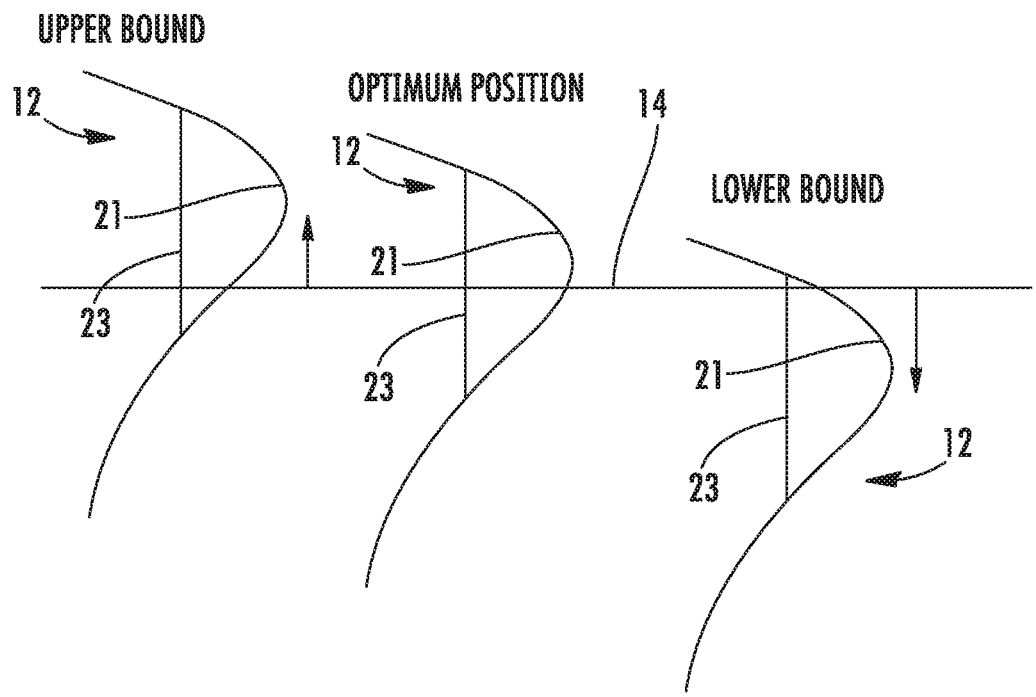
FIG. 6 depicts the boundaries of the beam focal line for producing a damage track to separate sections of a thin ceramic, according to an exemplary embodiment.

Referring to FIG. 6, it can be seen that laser scribing of a thin ceramic material 14 is relatively insensitive to focus position of the beam focal line 12 (which is shown schematically in terms of the intensity profile 21 and damage threshold 23). Specifically, because the length of the beam focal line 12 over which the intensity 21 is higher than the damage threshold 23 is longer than the thickness of the ceramic material 14, the ceramic material 14 can be move vertically with respect to the beam focal line without affecting the laser scribing process. In a manufacturing setting, this allows for greater tolerances during production. For example, the beam focal line 12 can be focused such that the intensity profile 21 has a region above the damage threshold 23 corresponding to a desired tolerance. In embodiments, the length of the beam focal line 12 above the damage threshold 23 is up to 2× the thickness of the ceramic material 14. In other embodiments, the length of the beam focal line 12 above the damage threshold 23 is up to 1.5× the thickness of the ceramic material 14. In still other embodiments, length of the beam focal line 12 above the damage threshold 23 is up to 1.1× the thickness of the ceramic material 14. For example, when laser scribing a ceramic material 14 having a thickness of 40 μm, the beam focal line 12 may have a length over which the intensity 21 is above the damage threshold 23 of, e.g., up to 44 μm, up to 60 μm, or up to 80 μm.

Figure 7:
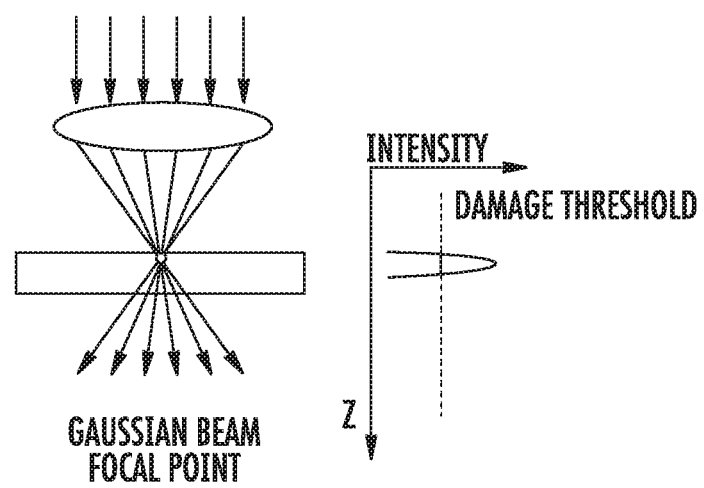
FIG. 7 depicts a Gaussian beam focal point used in conventional laser ablation processes.
Figure 8:
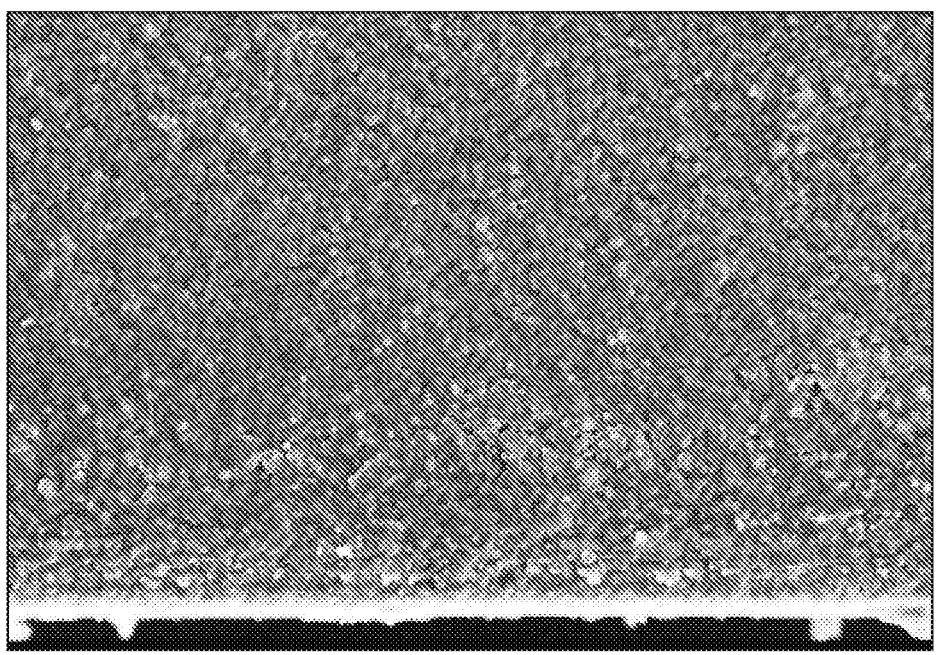
FIG. 8 is an SEM image of a surface of a thin ceramic cut using laser ablation.
Figure 9:
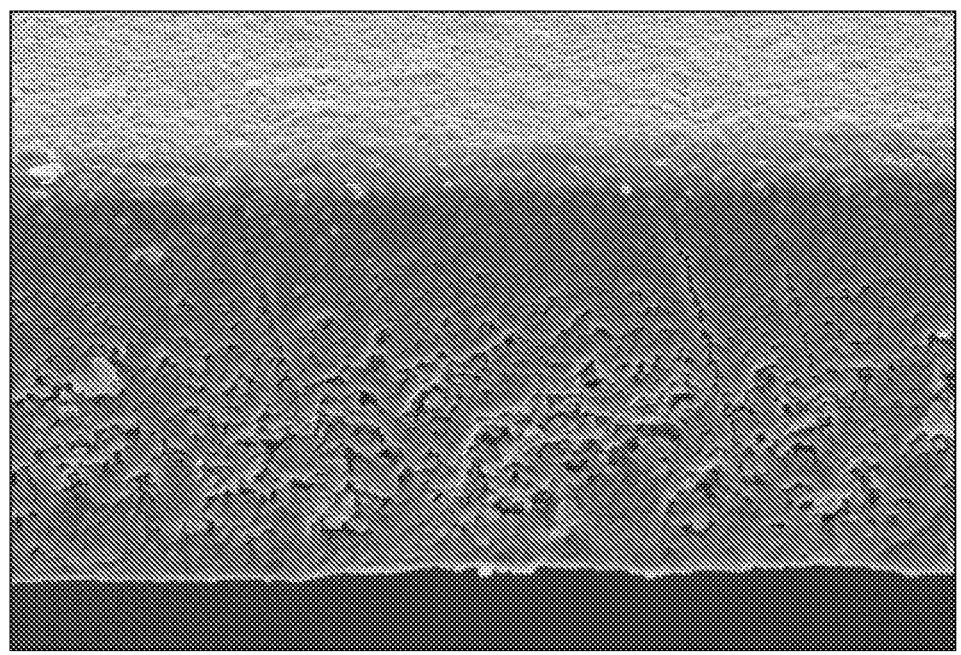
FIG. 9 is an SEM image of a scribed edge surface of the thin ceramic material of FIG. 7.

For the purposes of comparison, FIGS. 7-9 are provided and depict the conventional laser ablation process and a ceramic material cut using laser ablation. Referring first to FIG. 7, the laser ablation process uses a Gaussian beam focal point, instead of a beam focal line. As can be seen from the intensity profile in FIG. 7, the intensity of the focal point is above the damage threshold for only a portion of the thickness of the ceramic material. Accordingly, in order to cut through the thickness of a ceramic material, multiple passes of the focal point over the same line need to be made. This causes the cutting process to be relatively slow (on the order of millimeters per second). Additionally, laser ablation creates debris which can redeposit on the surface and induce a phase change around the edge of the cut, resulting in low edge strength.

FIG. 8 depicts the top surface of a ceramic material that was cut using laser ablation. As can be seen, there is a substantial amount of ablated material located within 10 to 20 μm of the cut edge. This recondensated material is porous and traps moisture, which can lead to degassing when used in hermetic application or high losses when used in high frequency applications. FIG. 3, by comparison, demonstrates that a much cleaner surface is produced via the disclosed laser scribing process.

FIG. 9 shows the ablated edge of a ceramic material that was cut using laser ablation. Again, it can be seen that much of the ablated material recondensated along the ablated edge surface. As compared to FIG. 4, the ablated edge surface produced via laser ablation is much smoother than the granular scribed edge surface produced via laser scribing.

The recondensation of ablated material at the edge affects the properties of the ceramic material. For example, recondensation of ablated material affects moisture absorption at the edge. In FIG. 10, Fourier-transform infrared spectroscopy (FTIR) spectra are provided for various regions of a thin alumina sample that was cut using laser ablation. Three spectra were obtained at three points (P1-P3) along the length of a sample and away from the laser ablated edge, and a fourth spectrum also away from the laser ablated edge was obtained after the thin alumina ceramic was exposed to liquid nitrogen ("LIQ $N_2$"). The liquid nitrogen froze any moisture absorbed at the edge so as to lock the moisture in the edge during testing. Additionally, three spectra were obtained at the points P1-P3 but at the very edge of the sample, and a fourth spectrum also at the very edge was obtained after exposure to liquid nitrogen. All of the spectra include peaks at the wavenumbers characteristic of aluminum-oxygen bonds (Al—O—Al). However, as can be seen in comparing each of the spectra away from the edge with each of the spectra at the very edge, the spectra for samples at the very edge also display characteristic wavenumbers for OH bond bending and stretching, indicating the absorption of moisture at the edge. Such moisture absorption can have negative effects on the dielectric properties of the ceramic material when used in electronic components.

The laser scribing method as described herein provides several advantages, especially as compared to the conventional process of laser ablation. For example, laser scribing produces less debris that can cause degraded edge properties, such as increased moisture absorption, lower fracture toughness, and lower edge strength. Additionally, producing less debris means that there is no need for edge and surface cleaning after laser scribing. Further, the processing speeds are substantially higher than conventional processes like laser ablation. In particular, laser scribing takes place at a rate in the range of meters per second, whereas laser ablation takes place at a rate on the order of millimeters per second. Still further, laser scribing helps minimize waste produced during manufacturing because the method does not produce kerf, allowing parts to be packed more tightly together on a ceramic sheet or ribbon and allowing use of both sections of the ceramic material to be used.

Thin ceramic components produced through laser scribing are particularly suitable for use in batteries and capacitors. These applications have demanding requirements for the electrical properties of the ceramic components used therein, such as providing a very high dielectric insulating material with no holes or shorts. For both applications, multiple layers of ceramics and electrodes are arranged in stacks or rolls, and by making the ceramic components thin, the batters and capacitors are able to provide higher energy/voltage per unit volume.

While microperforation laser cutting process as disclosed herein may be used for to highly transparent materials such as glass and sapphire, application to polycrystalline ceramics may be particularly counterintuitive. Applicants believe there are few examples of transparent ceramics due to difficulty of sintering polycrystalline ceramics to a sufficiently pore-free (e.g. with very high relative density, >99.8%) microstructure, and less transparent ceramics may have low in-line transmittance due to scattering from porosity. Applicants believe removing residual porosity, such as to below 0.2%, may be particularly difficult or impossible with conventional ambient atmosphere sintering.

Applicants have found that some thin ceramic layers (e.g., 200 μm or less), as disclosed herein, may offer an alternative means of obtaining high in-line transmittance, as material thickness also contributes to the extent of scattering. Applicants experimental results show that in-line transmittance of alumina with 99.5% relative density at 80 μm thick is about 60% at 1064 nm, and microperforation laser cutting approach, as disclosed herein, may thus (surprisingly) be applied to certain polycrystalline ceramics. In some embodiments, wherein thickness and porosity of the ceramic, as disclosed herein (e.g., polycrystalline, alumina, zirconia, etc.) is such that the ceramic has in-line transmittance of at least 30% for light at a reference wavelength between 1000 and 1100 nm wavelength, such as at least 50%, such as at least 60%, such as for reference light at 1064 nm, which facilitates the microperforation laser cutting. In-line transmittance is measured with the sample fixed at 0° incidence and detector at 180° position, distance from the sample to the detector is ~16 cm, and a 1° aperture is fixed at the detector face to exclude larger angle scatter from the measurement.

In accordance with the above disclosure, polycrystalline ceramic materials that may successfully be processed as disclosed herein include alumina, zirconia including stabilized zirconias, such as cubic or tetragonal yttrium stabilized zirconias (YSZs), zirconia-toughened aluminas and alumina-toughened zirconias, silicates including mullite, cordierite, fosterite and spinels, silicon carbide, aluminum nitride, lithium lanthanum zirconium oxide garnets and derivatives, magnesia, titania and multicomponent titanates including $BaTiO_3$ and derivatives, and ferrite materials. Such materials may be made in thin form, such as less than 200 μm thick, with relative density of at least 99% (e.g., at least 99.8%, at least 99.9%), and fine-grained microstructure (e.g., grain size d50<5 μm), which have in-line transmission to facilitate microperforation laser processing as disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A laser scribed ceramic component, comprising:
   a polycrystalline, sintered ceramic material having a thickness of 500 µm or less between a first outer surface and a second outer surface; and
   a scribed edge having at a plurality of ablated regions extending from the first outer surface into the thickness of the ceramic material, each ablated region spaced from 2 µm to 50 µm apart from an adjacent ablated region;
   wherein each of the plurality of ablated regions have a first surface roughness and a depth of less than 10 µm; and
   wherein a remainder of the scribed edge is a cleaved edge having a second surface roughness, the first surface roughness being less than the second surface roughness.

2. The laser scribed ceramic component of claim 1, wherein the polycrystalline, sintered ceramic material comprises at least one of alumina, zirconia, titania, or silica.

3. The laser scribed ceramic component of claim 1, wherein the polycrystalline, sintered ceramic material has a thickness of from 10 µm to 100 µm.

4. The laser scribed ceramic component of claim 1, having an edge strength of at least 620 MPa.

5. The laser scribed ceramic component of claim 1, having a break resistance of less than 20 MPa.

6. The laser scribed ceramic component of claim 1, wherein the ablated regions have a width of from 0.1 µm to 5 µm.

7. The laser scribed ceramic component of claim 1, wherein the scribed edge comprises at most 10% of ablated regions.

8. A laser scribed ceramic substrate, comprising
   a polycrystalline, sintered ceramic material having a first surface and a second surface, the second surface being opposite the first surface, wherein the first surface and the second surface define a thickness of the polycrystalline, sintered ceramic material and wherein the thickness is less than 500 µm; and
   a damage track formed onto the first surface of the polycrystalline, sintered ceramic material, the damage track comprising a plurality of ablated regions in which each ablated region is spaced from 2 µm to 50 µm apart from an adjacent ablated region, wherein the damage track defines at least a first section of the polycrystalline, sintered ceramic material and a second section of the Polycrystalline, sintered ceramic material.

9. The laser scribed ceramic substrate of claim 8, wherein a break resistance of the damage track for separating the first section of the polycrystalline, sintered ceramic material from the second section of the ceramic material is 20 MPa or less.

10. The laser scribed ceramic substrate of claim 8, wherein the ablated regions have a depth that is less than the thickness of the polycrystalline, sintered ceramic material.

11. The laser scribed ceramic substrate of claim 8, wherein the polycrystalline, sintered ceramic material has a thickness of from 10 µm to 100 µm.

12. The laser scribed ceramic substrate of claim 11, wherein the ablated regions extend no more than 10 µm through the thickness of the polycrystalline, sintered ceramic material.

13. The laser scribed ceramic substrate of claim 8, wherein the polycrystalline, sintered ceramic material comprises at least one of alumina, zirconia, titania, or silica.

14. The laser scribed ceramic substrate of claim 8, wherein the damage track includes a surface crack between at least a portion of the ablated regions.

15. The laser scribed ceramic substrate of claim 8, wherein the damage track has zero kerf.

16. Cut ceramic, comprising:
   a body of the ceramic that is bound by a cut edge,
   wherein the ceramic is polycrystalline,
   wherein the body has a thickness of 200 µm or less,
   wherein porosity of the body is such that the body has in-line transmittance of at least 50% for light at a reference wavelength of 1064 nm,
   wherein the cut edge comprises localized material features spaced apart from one another along the edge, wherein the localized features comprise recurring stress residual profiles extending into the body and along the edge from a center on the cut edge of each respective localized feature.

17. The cut ceramic of claim 16, wherein the localized features comprise recurring variation in fictive temperature with greater fictive temperature at a center on the cut edge of each respective localized feature than fictive temperature halfway between adjoining localized features along the cut edge.

18. The cut ceramic of claim 16, wherein the localized features comprise recurring variation average grain size with greater average grain size at a center on the cut edge of each respective localized feature than average grain size halfway between adjoining localized features along the cut edge.

19. The cut ceramic of claim 16, wherein centers of adjacent localized material features are spaced apart from one another by at least 2 µm along the cut edge.

20. The cut ceramic of claim 16, wherein the cut edge comprises at least 10 of the localized material features.

* * * * *